United States Patent [19]

Sher et al.

[11] Patent Number: 5,017,784
[45] Date of Patent: May 21, 1991

[54] THERMAL DETECTOR

[75] Inventors: Arden Sher, Belmont; Karen Sabo, Newark, both of Calif.

[73] Assignee: Savin Corporation, Stamford, Conn.

[21] Appl. No.: 528,905

[22] Filed: May 29, 1990

Related U.S. Application Data

[60] Continuation of Ser. No. 877,437, Jun. 2. 1986, abandoned, which is a continuation-in-part of Ser. No. 822,833, Jan. 27, 1986, Pat. No. 4,719,026, which is a division of Ser. No. 710,586, Mar. 11, 1985, Pat. No. 4,585,535.

[51] Int. Cl.$^5$ .............................. G01J 1/00; G01J 5/20
[52] U.S. Cl. ................................ 250/338.1; 204/180.6; 252/501.1; 428/328; 428/402.24; 524/439
[58] Field of Search ........................... 428/402.24, 328; 252/501.1, 512; 250/338.1; 528/439

[56] References Cited

U.S. PATENT DOCUMENTS

| | | | |
|---|---|---|---|
| 2,963,674 | 12/1960 | Wormser et al. | 338/18 |
| 3,278,783 | 10/1966 | Brissot et al. | 250/338.1 X |
| 3,468,753 | 9/1969 | Vincent et al. | 428/328 |
| 3,867,315 | 2/1975 | Tigner et al. | 252/512 |
| 4,281,038 | 7/1981 | Ambros et al. | 428/328 X |
| 4,305,847 | 12/1981 | Stoetzer et al. | 252/512 |
| 4,370,640 | 1/1983 | Dynes et al. | 338/25 |
| 4,545,926 | 10/1985 | Fouts, Jr. et al. | 252/513 X |
| 4,590,142 | 5/1986 | Yamazaki et al. | 428/402.24 X |
| 4,670,333 | 6/1987 | Miyoshi et al. | 428/328 X |
| 4,713,293 | 12/1987 | Asano et al. | 428/328 X |

OTHER PUBLICATIONS

European Search Report EP 87 30 9594.

Primary Examiner—Richard D. Lovering
Attorney, Agent, or Firm—Kenyon & Kenyon

[57] ABSTRACT

A thermal detector and method of making the same in which a suspension of binder-encapsulated copper particles is produced by comminuting a chip formed by dry-milling a major amount of copper particles with a minor amount of a binder and a charge director to produce the chip of copper particles in an encapsulant having functional sites. The bits of comminuted material are wet-milled with a major amount of a low-boiling aliphatic hydrocarbon to produce a suspension from which encapsulated copper particles are deposited on a substrate by electrophoresis. The deposit is electron-beam cured to form the detector.

4 Claims, 3 Drawing Sheets

THERMAL DETECTOR

This is a continuation of U.S. Ser. No. 06/877,437 filed 2 June 1986, which is a continuation-in-part of U.S. Ser. No. 06/822,833 filed 27 Jan. 1986 (now U.S. Pat. No. 4,719,026), which is a division of U.S. Ser. No. 06/710,586 filed 11 Mar. 1985 (now U.S. Pat. No. 4,585,535 and now abandoned.

FIELD OF THE INVENTION

The invention relates to the field of infrared detectors and more particularly to a new class of thermal detectors.

BACKGROUND OF THE INVENTION

Infrared technology has a wide variety of applications, ranging from missile defense to meteorology and medical diagnostics. Two important applications are guidance systems and reconnaissance devices.

An essential part of every infrared system is the radiation detector. Known types of detectors are photodetectors, pyroelectric detectors and thermal detectors or bolometers. When photodetectors operate at wavelengths beyond three microns, they must be cooled by liquid helium or liquid nitrogen devices which occupy space and consume power. Pyroelectric detectors which are fabricated from ferroelectric materials whose dielectric polarization responds to a change in temperature and bolometers which are made from materials whose conductivity is temperature sensitive, do not require such cooling. Rather, they respond to long-wavelength radiation at ambient operating temperatures. Thus, they have found wide use in applications in which a flat, extensive, spectral response is required or where little weight can be allowed for bulky cryogenics.

Owing to the fact that pyroelectric detectors and bolometers are severely noise limited by the properties of the materials of which they are made, they suffer from poor responsivities. As a result, it is difficult to build such devices into high resolution imaging systems.

SUMMARY OF THE INVENTION

One object of our invention is to provide a new class of thermal detector.

Another object of our invention is to provide a thermal detector which overcomes the defects of thermal detectors of the prior art.

A further object of our invention is to provide a thermal detector which has an improved response as compared with thermal detectors of the prior art.

Yet another object of our invention is to provide a method of making an improved thermal detector.

Other and further objects of our invention will appear from the following description.

BRIEF DESCRIPTION OF THE DRAWINGS

In the accompanying drawings to which reference is made in the instant specification and which are to be read in conjunction therewith, and in which like parts are indicated by like reference characters in the various views.

DESCRIPTION OF THE PREFERRED EMBODIMENT

Figure 1:
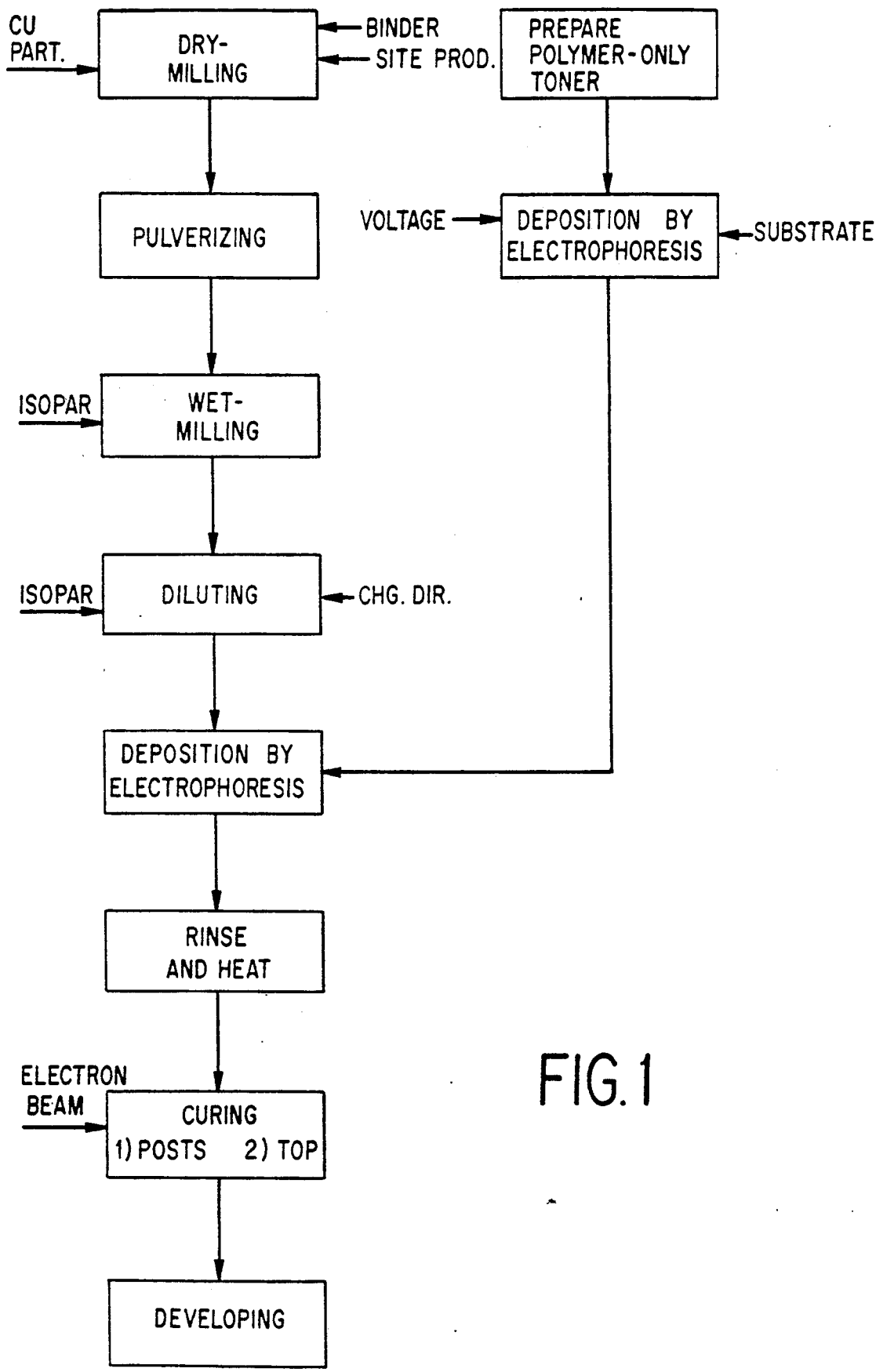
FIG. 1 is a flow chart illustrating our method of making our improved thermal detector.

Referring now to FIG. 1, in the practice of our method of forming our improved thermal detector we first prepare a suspension of resin-encapsulated copper particles which may be deposited by electrophoresis on a suitable substrate. In the first step of preparing the suspension, we charge a two roll rubber mill of a type known to the art with 100 gm of Carnauba wax, 50 gm AC 201, 50 gm AC 540 and 1800 gm 10 um copper. AC 201 is a trademark of Allied Chemical Corporation for a calcium salt of ethylene-acrylic acid copolymer. AC 540 is a trademark of Allied Chemical Corporation for ethylene-acrylic acid copolymer. The AC 540 improves the particle dispersion in the rubber mill, producing finer particles. The AC 201 provides molecules which have hydrogen bonds exposed. These provide the functional sites, or hooks, with which a charge director may react. Another addition agent for controlling functional sites is stearic acid. The AC 540 may, in and of itself, act as a binder. Other addition agents for the control of functional sites are styrene-acrylate copolymers, ethylene-vinyl acetate-acrylic acid plus copolymers, oxidized polyethylenes, acrylate ester polymers, acrylate ester-acrylic acid copolymers, styrene-allyl alcohol copolymers, polyethylene oxide polymers, and propylene-ethylene oxide copolymers. While these polymers are added to control the functional sites for the binder, they in themselves may act as binders. Furthermore, all of the materials charged in the first step of our process are insoluble or unsolvatable in ISOPAR at temperatures below 40° C. The copper particles, the binder, and the agent for controlling functional sites are blended in a rubber mill at 130° C. for one hour, at which time the copper is uniformly dispersed. A higher temperature shortens the time for dispersing the pigment.

On cooling, the encapsulated copper particles form a crayon-like solid, which is then powdered. We then charge the powder from the pulverizing step and 2800 grams of ISOPAR-H to the wet-milling step, which takes place in an attritor. While the pulverizing step reduces the time that is necessary to wet-mill the powder, it will be understood that the crayon-like solid coming from the rubber mill can be comminuted into smaller particles by any desired means which will enable the pieces formed to be conveniently charged to the attritor. We then wet-mill the encapsulated copper particles for 360 hours. Longer milling improves the dispersion and produces smaller average particle sizes. The powder charged to the wet-milling step comprises spheres containing one or more encapsulated copper particles and having a diameter of approximately 3 to 0.5 um.

The nonpolar dispersant liquid used in the wet-milling step are isomerized aliphatic hydrocarbons—more particularly, ISOPAR-G, ISOPAR-H, ISOPAR-K, ISOPAR-L, and ISOPAR M. These ISOPARs are narrow cuts of isoparaffinic hydrocarbon fractions with extremely high levels of purity. For example, the boiling range of ISOPAR-G is between 156° C. and 176° C. ISOPAR-L has a mid-boiling point of approximately 194° C. ISOPAR-M has a flash point of 77° C. and an auto-ignition temperature of 338° C. Stringent manufacturing specifications limit undesirable components, such as sulphur, acids, carboxyl, and chlorides to a few parts per million. They are substantially odorless, possessing only a very mild paraffinic odor. They have excellent odor stability and are all manufactured by the Exxon Corporation.

All of the dispersant liquids have an electrical volume resistivity in excess of $10^9$ ohm centimeters and a dielectric constant below 3.0. The vapor pressures at 25° C. are less than 10 kPa. A desirable ISOPAR is ISOPAR-G, which has a flash point, determined by the tag closed cup method, of 40° C. ISOPAR L has a flash point of 61° C., determined by the same method; while ISOPAR-M has a flash point, determined by the Pensky-Martens method, of 77° C. While we have described the preferred dispersants, the essential characteristics are the volume resistivity and the dielectric constant. In addition, a feature of the dispersants is a low Kauri-butanol value, in the vicinity of 27 or 28 determined by ASTM D 1133.

The addition agents which are present not only act as the control for the functional sites, but increase the melt viscosity of the carnauba wax. In addition, these materials can be cross-linked to cure the deposit into a hard, durable surface When it is desired to use the solution to deposit a coating on a substrate to form a thermal detector, we dilute the dispersion so that it has a solids content of about 5% in respect of the liquid As a charge director we add 8 mgm of barium bistrydebyl sulfosuccinate per gram of toner solids to charge direct the toner to a conductivity of $15.6 p\Omega^{-1}-cm^{-1}$. The material is now ready for deposition on a substrate by electrophoresis. There are two apparently different kinds of charge directors. In the first case, the charge director in ISOPAR has a conductivity measured at 1 kHz that is larger than the conductivity obtained when it is mixed with toner particles. Lecithin and barium petronate (BaPet) are examples. In the second case, the charge director in ISOPAR has almost no conductivity. However, when it is mixed with toner particles, there is a substantial conductivity. Barium sulfosuccinate (BaOT) and salts of bistrydebyl sulfosuccinate are examples of this case.

The preferred charge directors are those with no conductivity in the absence of toner particles. Any excess conductivity results from the presence of ions in the bath with the same sign as that of the toner particles. These unwanted ions respond to the same fields driving the toner and deposit charge without pigment.

The charge per toner particle (about 0.5 to 3.0μradius) has been measured to be in the range of 100 to several hundred charges. The zeta potentials arising from these charges are of the order of 1V, large compared to thermal energies. This is made possible by the high density of functional sites on each toner particle (about $10^4$ to $10^6$ sites) and the nature of their chemical reactions with the charge director molecules.

The dispersion stability is caused by the large charge per toner particle. The repulsive forces between like-charged particles keep them apart when the separation is large, and long molecules that act as bumpers (produce steric hindrance) prevent the surfaces of the toners from approaching closely enough to one another so that the induced dipole attractive interaction can become effective and cause agglomeration. The coulomb repulsive interaction varies as the reciprocal of separation between the particles, while the charge-induced attractive dipole interaction varies as the fourth power of the reciprocal of their separation. As long as the particles stay far enough apart, the repulsive interactions dominate and the dispersion is stable. If the particles are allowed to begin to agglomerate, their capacitance changes, the charge per particle changes, and the bath properties degrade.

Charge director can be added during the wet-milling step or to the dispersion in the depositing step. The addition of the charge director during the wet milling step tends to improve the dispersion. The ideal amount of charge director would produce the same number of negatively charged entities as there are pigment particles; that is to say, there would be no excess free negatively charged ions. An excess number of negative ions increases the conductivity of the liquid, adding a continuous phase conductivity to the development liquid. There is another condition that sets an upper limit on the amount of charge director used. The mobility of the counter ions should exceed that of the toner particles. In this case, when an external electric field is applied that is intended to drive the toner particles onto the substrate, the more mobile counter ions will respond first, leaving a depletion layer of space charge adjacent to the deposition substrate and accumulating on the opposite electrode. The thickness of the depletion layer depends on the applied voltage ad the carrier concentration. Once the depletion layer forms, it is the only region where there are fields present to drive toner particles onto the substrate. The toner particles then move to the surface under the influence of space-charge-limited-current conditions. This is desirable, since in this circumstance the spatial distribution of particles reaching the surface is more uniform than a random particle-distribution. The resulting films tend to be uniform, smooth, and free of pinholes. If too much charge director is used and the mobility of the toner particles exceeds that of the counter ions, they will not deposit under space-charge-limited-current conditions.

The depositing step is carried out in a bath containing approximately 5 percent by weight of the encapsulated copper particles which have been charge-directed. The size-distribution of the coated particles will vary. However, the mobility of the small particles and of the large particles is approximately the same, provided the hook density is independent of particle size. The large particles will accumulate more charge, but they will have more viscous drag than the smaller particles. Conversely, the smaller particles will have a lesser charge, but will exercise a lower viscous drag while moving through the dispersant liquid. The result is that the particle size is self-compensating. The drift velocity of the particles is a function of the applied field. The higher the field, the more rapid is the drift velocity. Varying the potential of the applied field enables us to control the thickness of the deposited layer. If we are depositing on a metal disk, for example, we may use a potential of between 400 volts and 1000 volts with the metal being connected to the positive electrode. The time of subjection to the field may vary between 0.001 and 1 second. When it is desired to deposit on an insulating carrier such as Mylar tape, we back the tape with a positive electrode and apply a voltage of about 1000 volts. Again, the thickness of the deposit is controlled by the length of time the carrier is in the field. Alternatively, insulators can be made by first subjecting the substrate to a corona charging step and then passing the charged medium through a development region where toner is attracted to it.

The deposition step is effected, as pointed out above, by applying a potential to cause the charged particles to deposit on the substrate. The thickness of the coating is not only a function of the concentration of solids in the bath, but also varies as a function of the voltage and of the time. It is possible to completely exhaust the bath of encapsulated particles, between the development electrode and the substrate, by allowing sufficient time for the depositing step to proceed. The length of time the operating voltage is imposed may vary between 0.1 second and 2 seconds or more.

Figure 2:
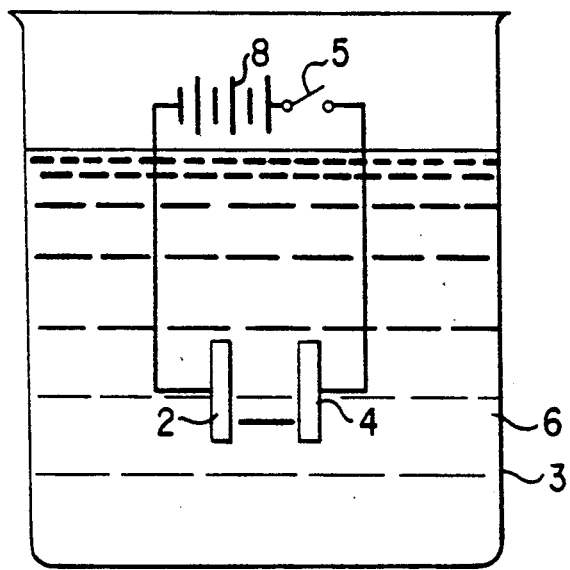
FIG. 2 is a schematic view illustrating the apparatus which may be used in carrying out one step of our method of making our improved thermal detector.

The deposition onto substrates has been accomplished in a number of different ways. Referring now to FIG. 2, a development electrode 2 is placed parallel to the substrate 4 and separated from it by 0.1 to 5 mm. The separation is usually placed at 1 mm. The assembly is then inserted into the toner bath 6 in a container 3, and a voltage pulse from a source of potential 8 is applied for a prescribed time by closing switch 5. The assembly is then removed from the bath, the development electrode is separated from the substrate, and the excess liquid is removed by dipping the substrate into pure ISOPAR, by spinning it off, and by passing an air knife (not shown) over the surface. The substrate is then placed onto a heater (not shown), while it is still wet, and its temperature is raised to the melting point of the binder and then lowered below the melting point to solidify the binder.

EXAMPLE I

The procedure described above in respect of FIG. 1 was followed to produce a standard formula made using 100 gm Carnauba wax, 50 gm AC201, 50 gm AC540, 1800 gm 10 um copper powder and 2800 gm Isopar H. To a 5% solids suspension of the standard formula 8 mgm of barium bistrydebyl sulfosuccinate were added to charge direct the toner to $15.6 p\Omega^{-1}-cm^{-1}$. Deposit was made on 6 um MYLAR attached to an aluminum stud with silver paint and super glue around the edge. The deposit was carried out at 1000 v for 0.2 seconds with an electrode spacing of 2 mm. After rinsing with clear ISOPAR, the deposit was heated to 150° C. and then cooled. Gold was evaporated onto the structure for contacts and a gold wire was attached with silver paint to permit resistance measurements of the resultant Sample A to be made. The amount of material deposited was 3.2 mgm.

EXAMPLE II

In an attempt to improve the material's electron beam resist property additional binder was added. A dispersion was obtained using 75% Cu/25% additional binder with the 75% Cu being the 5% solids suspension of the standard formula and the additional binder is 1% by weight solids where 50% is Carnauba wax and 50% AC540. This material was charge directed to $13.4 p\Omega^{-1}-cm^{-1}$ by adding 8 mgm barium bistrydebyl sulfosuccinate. Using this suspension, two Samples B and C were deposited on 6 um MYLAR using 2000 v for 0.2 second with 3 mm electrode spacing from a non-stirring bath of toner. The resultant samples were rinsed in pure ISOPAR, heated to 93° C. and cooled.

Figure 5:
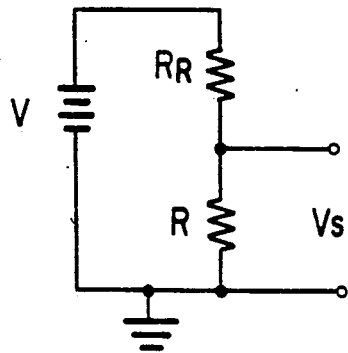
FIG. 5 is a schematic view of a simple series resistance circuit in which our improved detector may be connected to measure its resistance.

With the set-up described in Example I and using the simplified circuit of FIG. 5, where $R_R$ is a reference, resistance values of the samples were measured for a number of temperatures with three measurements at each temperature. The results are set forth in the following table in which the resistance given at each point is the average of the three measurements taken in ohms.

| T (°C.) | $\frac{1}{T}$ (°K. $\times 10^{-3}$) | $R_A$ | $R_B$ | $R_C$ |
|---|---|---|---|---|
| 25 | 3.35 | $1.1 \times 10^9$ | $7.33 \times 10^8$ | $9.33 \times 10^8$ |
| 30 | 3.30 | $8.7 \times 10^8$ | $5.3 \times 10^8$ | $6.87 \times 10^8$ |
| 40 | 3.19 | $4.67 \times 10^8$ | $2.8 \times 10^8$ | $3.77 \times 10^8$ |
| 50 | 3.10 | $2.67 \times 10^8$ | $1.53 \times 10^8$ | $2.13 \times 10^8$ |
| 60 | 3.00 | $1.7 \times 10^8$ | $9.53 \times 10^7$ | $1.33 \times 10^8$ |
| 70 | 2.92 | $1.17 \times 10^8$ | $6.93 \times 10^7$ | $9.3 \times 10^7$ |
| 80 | 2.83 | $7.77 \times 10^7$ | $5.2 \times 10^7$ | $7.3 \times 10^7$ |

An important characteristic of the binder materials is that they are excellent electron beam resists, allowing patterns to be written on them with micrometer feature sizes. The resists have a high $\gamma$ which facilitates the preparation of the thermal detector structure to be described.

Figure 3:
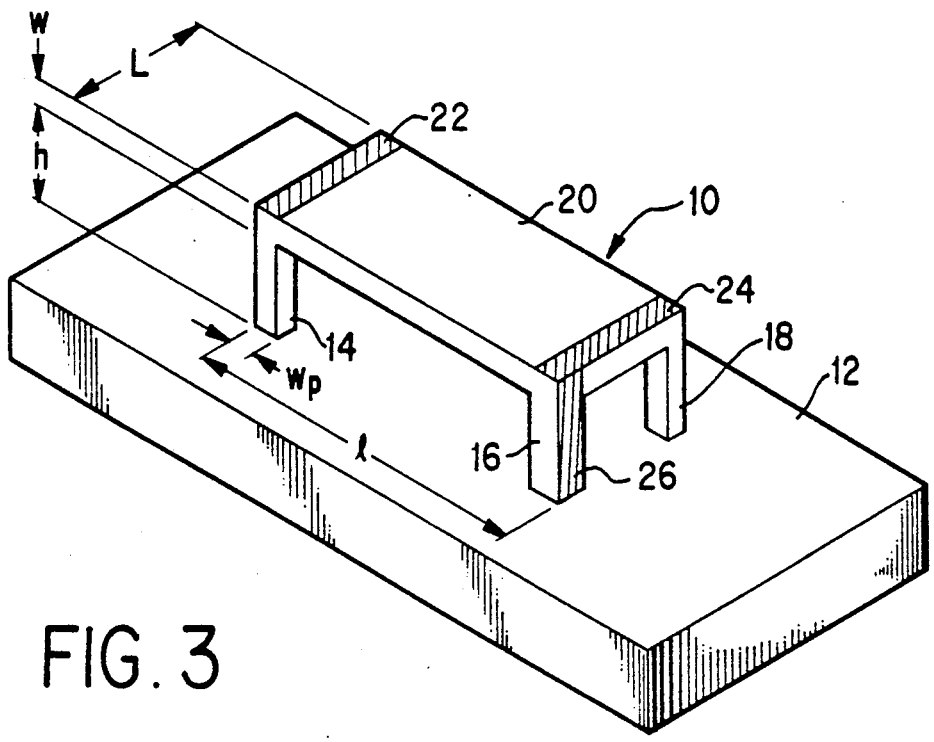
FIG. 3 is a schematic view illustrating the structure of our improved thermal detector.

Referring now to FIG. 3, an elemental improved thermal detector, indicated generally by the reference character 10 is formed on a substrate 12 which may, for example, be a silicon chip carrying the circuitry to be associated with the detector. The detector 10 includes a plurality of legs, of which three legs 14, 16 and 18 are shown in the drawing. These legs are formed of pure polymer. Legs 14, 16 and 18 are shown in the drawing. These legs are formed of pure polymer. Legs 14, 16 and 18 support the detector top 20 in spaced relation to the substrate 12. Top 20 is formed of resin-encapsulated copper particles. Respective contacts 22 and 24 at each end of the top 20 are connected to the substrate by conductors 26 extending along legs 14 and 16 for example.

In order to produce our elemental thermal detector 10 it is necessary to deposit a pure polymer layer on the substrate 12 before depositing the encapsulated copper particle layer. Referring again to FIG. 1, in order to carry out the preliminary pure polymer deposition, we first prepare a pure polymer suspension. This may be done by performing the steps described hereinabove in connection with the preparation of the encapsulated particle suspension, with the obvious exception that no copper particles are included.

The deposition of the pure polymer layer is carried by electrophoresis on the apparatus shown in FIG. 2, for example. We so regulate the conditions of the deposit as to produce a pure polymer layer having a thickness of h.

When the pure polymer layer has been deposited, the encapsulated copper particle layer is deposited in the manner described hereinabove to produce a layer having a thickness of w. The sample is then rinsed and heated.

In the next step of forming the elemental thermal detector 10, the sample is cured by electron beam techniques. In so doing the posts 14, 16 and 18 are written with a sufficiently high electron beam voltage so that their height h is greater than the thickness w of the film 20. After the legs are cured the top 20 is written using a lower beam voltage, the electron range of which is w. Following exposure to the electron beam the pattern is developed in an ultrasonic bath No chemical reactions are involved. While we have shown and described the formation of a single elemental thermal detector, it will readily be appreciated that, in practice, a multiplicity of such elemental devices are formed on a single substrate.

Figure 6:
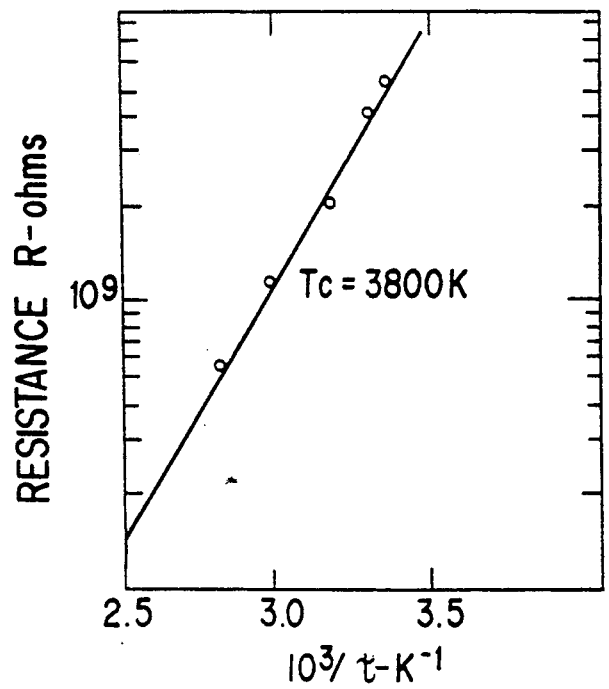
FIG. 6 is a plot of measured resistance as a function of temperature for our improved thermal detector.

Our studies have shown that the material of which the top 20 is formed, which material is made up of copper particles ranging in diameter from 3 to 0.5 um mixed in an organic binder has a thermally activated resistivity:

$$\rho(T) = \rho_\infty e^{(-T_c/T)} \tag{1}$$

where $\rho_\infty$ is the resistivity projected to an infinite temperature and $T_c$ is the characteristic activation temperature. FIG. 6 shows a representative data set. The quantity $\rho_\infty$ depends on the copper particle size and the pigment-to-binder ratio. Specifically, $\rho_\infty$ decreases as the particle size decreases or as the particle-to-binder ratio increases. Activation temperature $T_c$ is a measure of the barrier that tends to prevent carriers from transporting between particles at a point of contact. For copper we have measured $T_c$ in the range 3000° K. to 4800° K., depending on how the samples were prepared. In response to a sinusoidally varying radiation source, the magnitude of the voltage response $V_s$ of a device with resistance R connected in the simple circuit of FIG. 5 is given by:

$$V_s = \frac{T_c}{T} \cdot \frac{R}{R + R_R} \cdot V \cdot \frac{\Delta T}{T} \tag{2}$$

where $R_R$ is a reference resistance, V is the applied voltage across the series circuit, and $\Delta T$ is the magnitude of the temperature variation of the device, as caused by the modulated incident radiation. The quantity ($T_c/T$) represents a gain factor that enhances the signal relative to that obtained from mechanisms whose feature varies proportional to T. Our tests have shown $T_c \geq 3000°$ K. so that for $T \approx 300°$ K. the gain factor is approximately 10. This factor is one contributor to the enhanced responsivity exhibited by these devices.

In the structure illustrated in FIG. 3, the layer 20 which responds to absorbed incident radiation is very thin, approximately 1 um. As a result, it has a very small heat capacity per unit area Moreover, because the posts 14, 16, 18 have a low thermal conductivity the top 20 is well isolated from the substrate 12. Thus, the quantity $\Delta T/T$ of Equation (2) is large, another advantage of these devices.

Considering a bridge structure of the type shown to be illuminated with radiation of intensity P watts/cm² which is modulated at a frequency of $\omega$ radians/second, then the current signal to noise ratio is given by:

$$\frac{\Delta I}{I_n} = \frac{T_c}{T} \cdot \frac{V}{\sqrt{4kTR\Delta f}} \cdot \frac{\Delta T}{T} \tag{3}$$

where $\Delta f$ is the band width of the preamplifier following the detector. It can also be shown that in a high frequency limit the first harmonic amplitude of the temperature amplitude responding to the modulated radiant power is:

$$\Delta T = \frac{P(L1)}{C_v(L1w)\omega} = \frac{P}{C_v w \omega} \tag{4}$$

where $C_v$ is the heat capacity per unit volume of the detector body.

Combining equations (3) and (4) we get $$\frac{\Delta I}{I_o} = \frac{T_c}{T} \cdot \frac{V}{\sqrt{4kT\rho \frac{L}{1}w}} \cdot \frac{1}{C_v T \omega} \tag{5}$$

defining a new kind of normalized detectivity as:

$$D^* = \frac{\Delta I}{I_o} \cdot \frac{(\Delta f)^{\frac{1}{2}}}{P} \cdot \left(\frac{1}{L}\right)^{\frac{1}{2}} = \frac{T_c}{T} \cdot \frac{V}{\sqrt{4kT\rho\omega}} \cdot \frac{1}{C_v T \omega} \tag{6}$$

If:

$T_c = 2000°$ K.
$T = 300°$ K.
$V = 1$ volt
$k = 1.38 \times 10^{-23}$ joules/°K.
$\rho = 2\Omega$cm @ 300° K.
$w = 1 \mu$m
$\omega = 2\pi \times 10 \approx 60$ Hz
$C_v = 2$ joules/cm³

Then:

$$D^* \cong 2 \times 10^9 \left[\frac{cm^2 - Hz}{watt}\right] \tag{7}$$

If we assume $1/L = 1/10$, $P = 10^{-9}$ watts/cm² and $\Delta f = 1$ Hz, the signal to noise ratio will be:

$$\frac{\Delta I}{I_o} \cong 7 \tag{8}$$

indicating that $10^{-9}$ watts/cm² can be detected, so that the body is an excellent detector.

The noise is sufficiently high so that it is realistic to take $$V_n = \sqrt{4kTR\Delta f}$$

as the limit. For the numbers given:

$$V_n \cong \sqrt{\frac{4kT\rho L}{1w} \cdot \Delta f} = 3.3 \times 10^{-9} \text{ volts.} \tag{9}$$

An important consideration for a device such as that shown in FIG. 3 is the relative rate of thermal energy exchange between the surroundings and the active detector due to conduction through the support posts and radiation. By way of example, we will take the dimensions of the device shown in FIG. 3 as:

l = 10 um
L = 5 um
h = 5 um
w = w$_p$ = 1 um

Using the notation specified in the paper "Fundamental Noise Limits of Thermal Detectors" by Lynn E. Garn (1984) published at J. Appl. Phys., Vol. 55, No. 5, pp. 1243-1250 (1 March), the thermal conductance per unit area due to the radiation field $$g_{rf} = 4\epsilon_f \sigma T^3 = 6 \times 10^{-4} W\,cm^{-2}\,°C.^{-1} \quad (10)$$

for T=300° K., $\epsilon_f$=1, and $\sigma$ is the Steffen-Boltzmann constant.

The total thermal conductance due to the radiation field $g_{rf}(w - °C.^{-1})$ is:

$$g_{rf} = 2 \, lL g_{rf}. \quad (11)$$

The total thermal conductance of power from the active area through the four posts to the substrate $g_c(w - °C.^{-1})$ is:

$$g_c \cong \kappa h/4w_p^2 \quad (12)$$

where $\kappa$ is the thermal conductivity of the post's material, which for a polymeric material is:

$$\kappa = 4 \times 10^3 (w - cm^{-1} - °C.^{-1}). \quad (13)$$

Using the dimensional numbers given above, $$g_c/g_r \cong \frac{K}{g_{rf} l}\left(\frac{2w_p^2}{hL}\right) \cong 300 \quad (14)$$

Figure 4:
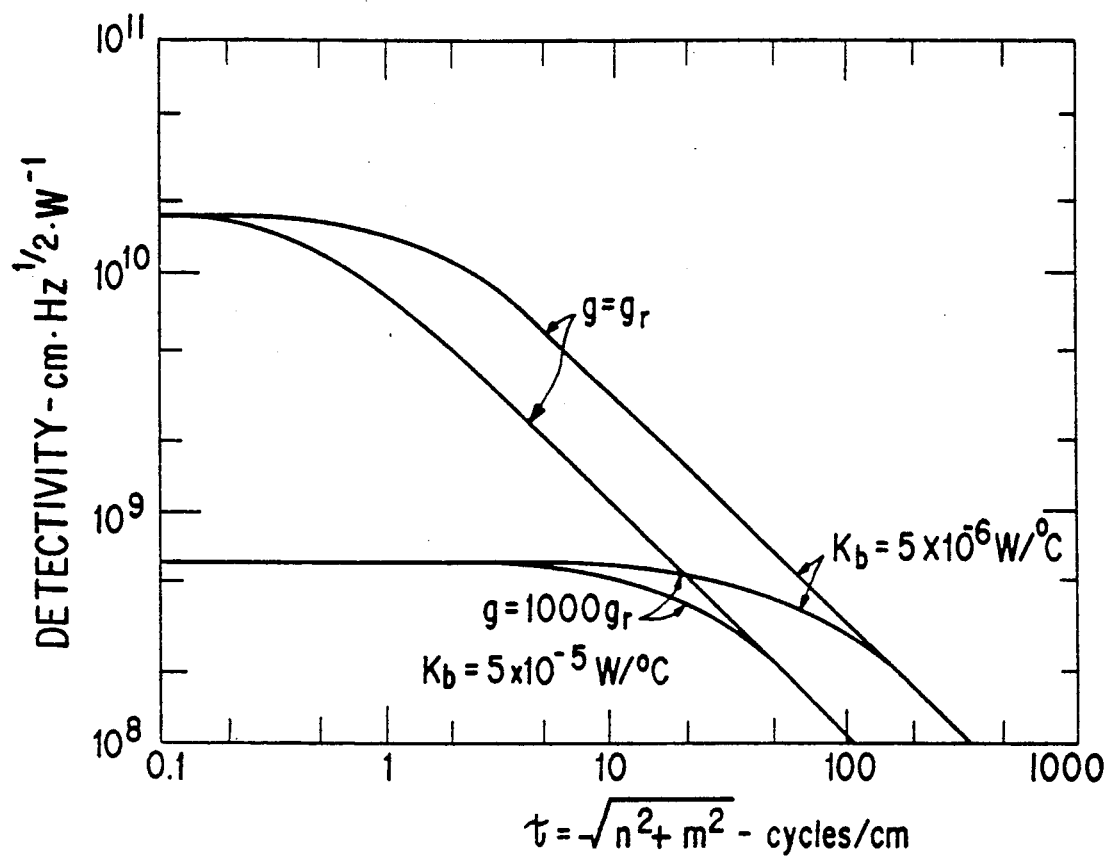
FIG. 4 is a series of curves illustrating the theoretical detectivity $D^*$ of temperature-noise-limited detector material.

From equation (14) it will be apparent that although the thermal conduction loss is much larger than radiation loss it is still small on an absolute basis. FIG. 4, which is derived from Garn's article, supra, shows that a g=300 $g_{rf}$ value still corresonds to a detectivity in excess of $10^9 cm - Hz^{\frac{1}{2}} - w^{-1}$.

Considering a multi-element structure with a separation between active areas of 25 um and including the weak thermal link through the posts between the substrate and the active area, there should be effective $\kappa b$ well below $\kappa b \cong 2 \times 10^{-6} w - ° C.^{-1}$, indicating that a multi-element device with 25 um separation between elements is feasible.

The thermal time constant $\tau$ is given by:

$$\tau \cong C_v l \, Lw/g_C \quad (15)$$

where $C_V$ is the heat capacity per unit volume of 2 (joules $-°C.^{-1} - cm^{-3}$). Using the same dimensional numbers as before $\tau \cong 10^{-3}$s. With the room temperature material resistivity of $4 \times 10^5 \Omega - cm$ and the activation temperature 3000° K. corresponding to an activation energy of 0.17 ev, the device shown in FIG. 3 has a resistance of $8 \times 10^9 \Omega$, an acceptable value. The thermal time constant $\tau$ can be controlled by adjusting the geometry. If all dimensions are scaled down by $S, \tau$ scales down proportionally to $S^2$.

Owing to the fact that the resistivity varies exponentially with temperature, the responsivity of the devices is high. While the high responsivity will not increase the maximum detectivity, it does allow the maximum D* to be reached with lower constraints on the noise figure of the amplifiers.

It will be seen that we have accomplished the objects of our invention. We have provided a new class of thermal detector. Our detector responds to long-wavelength radiation at ambient temperatures. It has an improved response as compared with thermal detectors of the prior art. We have provided a method of making our improved thermal detector It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A thermal detector including in combination a carrier and a coating of copper particles deposited thereon, said copper particles being encapsulated in a binder comprising a thermoplastic polymer which is insoluble in a low-boiling aliphatic hydrocarbon liquid at ambient or room temperatures and is softenable at temperatures above 70° C., said binder having a plurality of functional sites and having a minor amount of a charge director incorporated therein.

2. A thermal detector including in combination a substrate and a layer of binder-encapsulated copper particles carried by said substrate.

3. A thermal detector as in claim 2 in which said copper particles are 0.2 to 2 um copper powder particles.

4. A thermal detector as in claim 2 in which said binder comprises carnauba wax.

* * * * *

UNITED STATES PATENT AND TRADEMARK OFFICE
CERTIFICATE OF CORRECTION

PATENT NO. : 5,017,784
DATED : 21 May 1991
INVENTOR(S) : Arden Sher et al

It is certified that error appears in the above-identified patent and that said Letters Patent is hereby corrected as shown below:

| Column | Line | |
|---|---|---|
| 1 | 5 | After "1986" insert --now abandoned,--. |
| 1 | 9 | After "4,585,535" delete "and now abandoned". |
| 1 | 38 | After "that" insert --both--. |
| 2 | 64 | Change "um" to --$\mu$m--. |
| 4 | 32 | Change "ad" to --and--. |
| 5 | 44 | Change "um" to --$\mu$m--. |
| 6 | 51 | After "carried" insert --out--. |
| 7 | 39 | Change "proportional" to --proportionally--. |
| 9 | 39 | Change "um" to --$\mu$m--. |

Signed and Sealed this

Second Day of March, 1993

*Attest:*

STEPHEN G. KUNIN

*Attesting Officer*     Acting Commissioner of Patents and Trademarks